Sept. 23, 1941.  M. PÉGARD  2,256,789
CLUTCH DEVICE
Filed Jan. 3, 1940
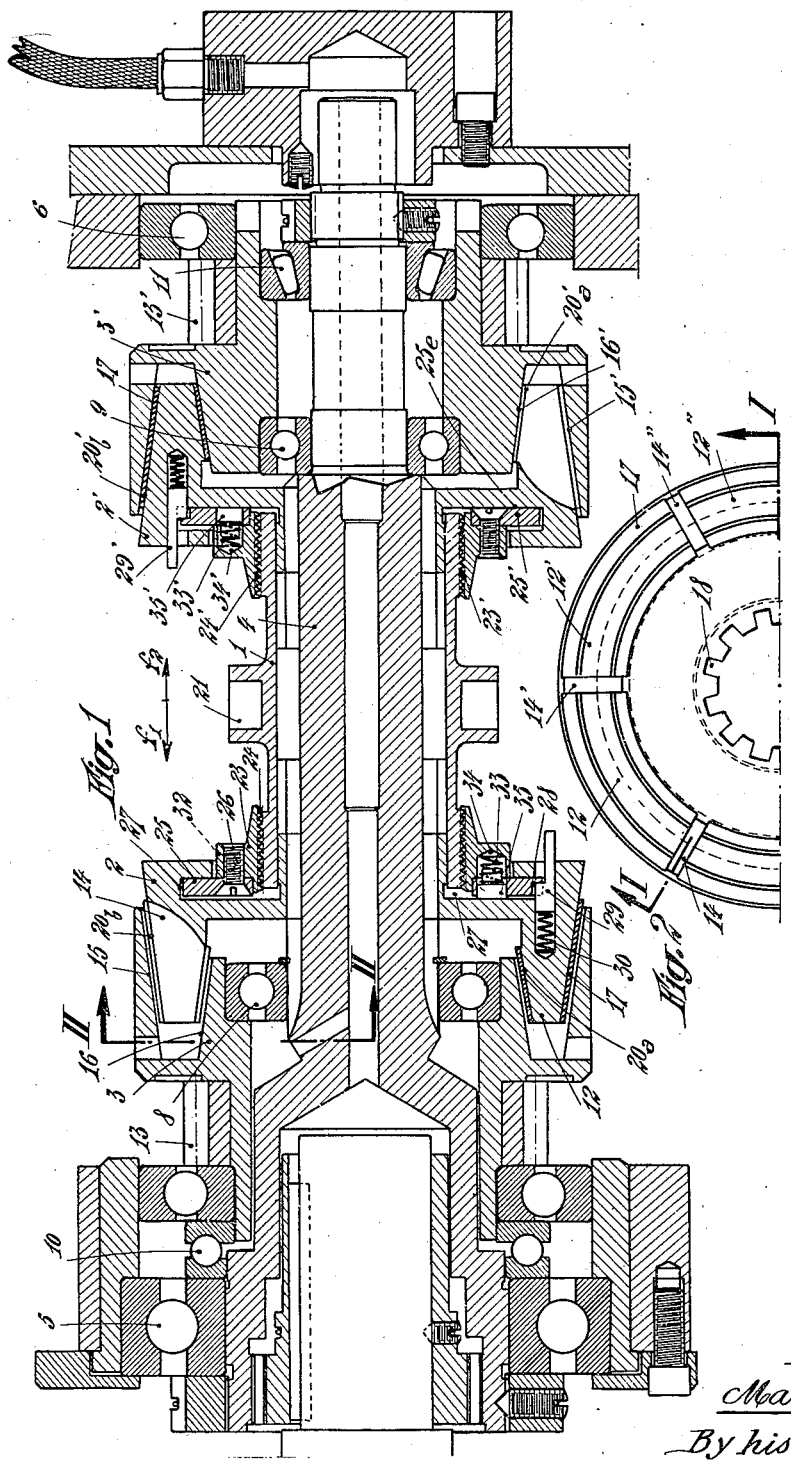
Inventor:
Marcel Pégard,
By his Attorneys,
Fraser, Myers & Manley Patented Sept. 23, 1941

2,256,789

UNITED STATES PATENT OFFICE 2,256,789

CLUTCH DEVICE

Marcel Pégard, Paris, France

Application January 3, 1940, Serial No. 312,219
In France August 26, 1939

5 Claims. (Cl. 192—66)

The present invention concerns improvements in clutch devices and the like.

The object of the invention is to provide improvements in clutch devices of the simple or multiple type including an axially slidable male plate adapted to engage in a corresponding portion of the female plate of the clutch.

According to an important feature of the invention, the contact elements of the male plate of the clutch device are made flexible, in such manner as to be able to fit exactly against the corresponding face or faces of the female plate of the clutch, even when the two parts of the clutch are not exactly coaxial with each other.

According to an embodiment of the invention, this relative flexibility is obtained by constituting the contact elements of one of the plates in the form of annular sectors limited by the lateral surfaces of two opposed coaxial cones, one of internal position, the other of external position. These annular sectors are engaged in a circular groove of trapezoidal section, provided in the female portion of the clutch.

The invention also concerns a device for regulating the distance between the male plates of the clutch device and the control member, in the case of double clutches for instance, the locking of the device in the position that has been chosen taking place automatically.

According to another feature of the invention, the connection between the control member in question and the male element of the clutch is given a certain elasticity in the axial direction, which permits a gradual transmission of the driving torque by friction.

Owing to these features, the construction according to the present invention permits of applying a double clutch device to a quick working reversing control mechanism used in connection with machine-tools, this control mechanism being adapted to operate without any substantial wear and tear, at very high speed, even if the clutch shaft is arranged vertically.

Other features of the present invention will result from the following detailed description of some specific embodiments thereof.

Preferred embodiments of the present invention will be hereinafter described, with reference to the accompanying drawing, given merely by way of example, and in which:

Fig. 1 is an axial section, on the line I—I of Fig. 2, of a double clutch device made according to an embodiment of the invention;

Fig. 2 is an elevational view of one-half of the male plate of the clutch as viewed from the position of line II—II of Fig. 1.

The clutch device shown by the drawing includes a central control sleeve 1, on either side of which are mounted two male clutch plates 2 and 2', adapted to come into cooperating contact with one or the other of the correspnoding female parts 3 and 3'. All these elements are arranged around a driving shaft 4 which is journalled in particular in ball bearings 5 and 6.

In the drawing, I have shown male plate 2' and female plate 3' in engaged position, while male plate 2 and female part 3 which cooperates therewith are in disengaged position.

The driving shaft 4 is grooved, and it is given its rotary movement directly from a motor or through any suitable transmission device.

The two female parts 3 and 3' turn freely in ball bearings 8 and 9 with respect to the driving shaft 4.

One of the female parts 3 is rigid with a toothed annular member 13 which is a part of a gear train (not shown on the drawing) belonging to the machine to be driven.

Another toothed annular member 13', rigid with the female part 3', is adapted, for instance, to drive a reversing gear included in the machine in question.

Each male clutch plate 2, 2' is provided, on its periphery, with several projecting contact elements, 12, 12', 12'', and so on. The number of these contact elements is six in the example shown by the drawing.

The friction surfaces of each of these elements belong to two frustums of cones, having opposed apexes and normally coaxial, one corresponding to the internal face and the other to the external face, 20a and 20b, respectively, the angles of said cones being equal.

It is advantageous first to make the male clutch plate on a lathe, so as to give it the axial section shown by the drawing, then to machine the radial cuts 14, 14', 14'', etc. which are provided between the contact elements 12, 12', 12'', etc. Owing to these radial cuts or gaps, the contact elements are given a certain flexibility so that each of them acts, when it engages into the corresponding V-shaped groove 15—16 of the female part 3, in the same manner as an independent wedge.

This arrangement is extremely useful for practical purposes because it is practically impossible to obtain, once the lining of the clutch has been fixed, a perfect concentricity of the inner cone 20a and of the outer cone 20b of the female part of the clutch, and, more especially, an accuracy such that both of the inner and outer cones of the male part and of the female part 3 are simultaneously in engagement with a uniformly distributed pressure.

Also, it should be noted that, due to the perfect adhesion of the elements of the clutch, resulting from the elasticity of the male cones, any relative slipping is impossible under normal working conditions. Wear and tear of the friction surfaces is thus extremely reduced.

The inner and outer faces of the contact elements 12, 12', 12'', etc., in the form of frusto-conical sectors, are lined with bands 17 of a matter which has the necessary qualities of adhesion.

Both of the male plates 2 and 2' of the clutch are fitted with inward grooves or notches 18 and they are slidable, in the direction of arrows $f_1$, $f_2$ on the grooved shaft 4, together with the control sleeve 1, which is provided with an annular groove 21 in which is to be engaged a fork or any other equivalent suitable device employed for operating the clutch. Ball thrust bearings 10, and conical roller thrust bearings 11, absorb the axial thrusts developed by the transmission of a torque through the clutch device. Of course, these thrust bearings might be replaced by any other equivalent elements.

The male clutch plates 2 and 2' are mounted on the central control sleeve 1, each of them through the intermediate of an annular member 23, 23' which is screwed on a threaded portion 24, 24'.

Any angular displacement of an annular member 23 with respect to sleeve 1 therefore corresponds to an axial displacement of a plate 2 with respect to control part 1, and to a variation of the distance between the two plates 2 and 2'.

As the parts which have just been mentioned are identical for each simple clutch element, I will describe the detail thereof for only one of said clutch elements, namely that located on the left hand side of Fig. 1.

Annular member 23 is connected to the corresponding plate 2 through an annular disc 25 fixed to said annular member 23 by means of screws 26 having their heads engaged in countersunk housings. Annular disc 25, which is made of several sectors fitted in an internal groove 27 of circular shape provided in plate 2, is provided with peripheral notches 28 distributed at equal intervals and into which locking fingers 29 are engaged under the action of springs 30 housed in recesses of male plate 2. Furthermore, annular member 23 is provided on its periphery with radial holes 32 adapted to receive the projections of a special key which may be used to facilitate turning of said annular member about the sleeve 1 for the purpose of adjustment.

The operations for the adjustment of the clutch consist in the adaptation of the total distance between the two male plates with a view to obtaining a suitable stroke or displacement of the control sleeve 1 and in the adjustment of the distance from each male plate to the axis of the clutch control in order to obtain symmetrical displacements of the control or operating mechanism with respect to its normal position, which corresponds to both of the plates of the clutch being disengaged.

By means of the special key above mentioned, the operator turns annular member 23 and annular disc 25 through an angle corresponding to the adjustment to be obtained, after having depressed fingers 29 which are thus driven into their respective recesses against the action of springs 30, thus disengaging annular member 25 from the male plate. Annular disc 23 then turns until finger 29 comes opposite another notch 28, into which it drops, thus automatically locking annular member 23 and annular disc 25 after a predetermined rotation.

It will be seen from Fig. 1 that there exists a certain play, which may be of some millimeters, between plate 2 and the corresponding face of annular disc 25, the thickness of said last mentioned disc being substantially smaller than the depth, measured in the axial direction, of the circular groove 27. Annular member 23 is provided with housings 34 which are uniformly distributed over its circumference, and these housings contain compression springs 33 which, due to their initial tension, constantly push pistons 35 against one face of plate 2, which is thus urged in the direction of arrow $f_1$.

Similar elements, designated by corresponding reference numerals, with a (') index, are adapted to urge the male plate 2' in the direction of arrow $f_2$.

When the clutch is being operated, that is to say for instance when the frusto-conical sections 12, 12', 12'' of plate 2' have been brought into contact with the faces of the groove 15', 16' of the female part 3', as the control sleeve 1 keeps moving in the direction of arrow $f_2$, the face 25e of annular disc 25' opposed to said sleeve moves in the direction of the corresponding face of plate 2', compressing springs 33, with a very small deformation thereof. Then these two last mentioned faces come into contact with each other, as visible on the right hand side of Fig. 1. From this time on, as the effort of applying cone plate 2' against part 3' is no longer limited by springs 33', these two elements will turn with the same speed.

The effort of applying the two portions of the clutch against each other is gradual and limited at the beginning of the drive and as long as the female plate 3' and the driven parts are not moving at the speed of shaft 4, there is a slipping between the two cones.

These arragements facilitate the adjustment of the axial stroke of the male plates 2 and 2'. As a matter of fact, they permit of not immediately blocking the clutch if it is a little too much tightened. Finally, they permit an extremely quick gradual drive when one part or the other is engaged.

The interposition of springs 33, 33' between the axially movable control sleeve 1 and the plates 2 and 2' provided with frusto-conical sectors further ensures a very satisfactory working of the clutch mechanism even when there is a certain play in the control parts so that they move slightly backward after an operation.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A clutch device which comprises, in combination, a grooved driving shaft, a female part provided with a circular groove of trapezoidal axial section, freely rotatable coaxially relatively to said shaft, a male part adapted to cooperate with said female part engaged on said grooved shaft so as to be slidable longitudinally but fixed angularly with respect thereto, a control sleeve coaxial with said shaft and movable with respect thereto, an annular device fixed to said male part and adjustably screwed on said sleeve, retractable locking means for automatically fixing said annular device with respect to said sleeve in predetermined angular positions, and contact elements carried by said male part adapted to engage in said groove of the female part, said contact elements being slightly flexible so as to be capable of fitting accurately in said groove, whereby a good working is obtained even when the two parts of the clutch are not perfectly coaxial.

2. A clutch device according to claim 1 in which said automatic locking means include fingers slidably carried by said male plate, and springs for urging said fingers into engagement with said annular device, for angular locking engagement with respect thereto.

3. A clutch device according to claim 1 in which said male plate is provided with an inner circular groove, said annular device including an annular disc engaged in said groove for transmitting thereto the axial movements of said sleeve.

4. A clutch device according to claim 1 in which said male clutch part is provided with an inner circular groove, said annular device including an annular disc engaged in said groove and of a thickness smaller than the axial depth of said groove, and spring means interposed between said annular disc and one of the faces of said last mentioned groove so as to obtain a gradual engagement of said male part with said female part.

5. A clutch device according to claim 1 in which said annular device is mounted with a certain axial play, and spring means tending to eliminate this play.

MARCEL PÉGARD.